United States Patent
Kodati et al.

(10) Patent No.: US 12,049,320 B2
(45) Date of Patent: Jul. 30, 2024

(54) PASSENGER SEATING ASSEMBLY WITH SWINGING SEATPAN FOR INCREASED PASSENGER EGRESS SPACE

(71) Applicant: B/E Aerospace, Inc., Winston-Salem, NC (US)

(72) Inventors: Sambasiva Rao Kodati, Kaikalur (IN); Arjun Koustubhan, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/711,634

(22) Filed: Apr. 1, 2022

(65) Prior Publication Data

US 2023/0249831 A1    Aug. 10, 2023

(30) Foreign Application Priority Data

Feb. 4, 2022  (IN) .............................. 202241005995

(51) Int. Cl.
   B64D 11/06    (2006.01)
(52) U.S. Cl.
   CPC ........ B64D 11/064 (2014.12); B64D 11/0696 (2013.01)
(58) Field of Classification Search
   CPC .......................... B64D 11/064; B64D 11/0611
   See application file for complete search history.

(56) References Cited

U.S. PATENT DOCUMENTS

| | | | | |
|---|---|---|---|---|
| 4,690,457 A | * | 9/1987 | Poncy | A61G 5/14 297/DIG. 10 |
| 4,778,217 A | * | 10/1988 | Lane | A61G 5/14 297/DIG. 10 |
| 5,011,224 A | * | 4/1991 | Paul | A61G 5/14 297/DIG. 10 |
| 6,481,798 B2 | * | 11/2002 | Romca | B64D 11/06 297/340 |
| 6,811,225 B1 | | 11/2004 | Konya et al. | |
| 11,529,000 B2 | * | 12/2022 | Cordes | A47C 31/126 |

(Continued)

FOREIGN PATENT DOCUMENTS

WO   2009121520 A1   10/2009
WO   2022169692 A1    8/2022

OTHER PUBLICATIONS

Extended European Search Report dated Jun. 6, 2023; European Application No. 23154146.7.

*Primary Examiner* — Timothy J Brindley
(74) *Attorney, Agent, or Firm* — Suiter Swantz IP

(57) ABSTRACT

A swinging seatpan assembly for a passenger seat includes a fixed seatpan frame attached to the seat structure and a mobile seatpan frame pivotably attached to the fixed seatpan frame by rollers configured for translation through slots in the fixed seatpan frame. Passengers occupying middle and aisle seats of a multiple-seat block or assembly may engage their respective swinging seatpan assemblies to allow an occupant of a window seat to enter/egress their seat without the middle-seat and aisle-seat passengers leaving their seats for the aisle. For example, the passenger may engage a release to unlock and push the mobile seatpan frame so that the mobile seatpan frame pivots rearward/downward, temporarily increasing the seat pitch distance and allowing the window-seat passenger increased egress space.

15 Claims, 7 Drawing Sheets

(56) References Cited

U.S. PATENT DOCUMENTS

| | | | |
|---|---|---|---|
| 2005/0046255 A1* | 3/2005 | Bressler | A61G 5/14 |
| | | | 297/326 |
| 2013/0009435 A1* | 1/2013 | Westerink | B60N 2/1839 |
| | | | 297/313 |
| 2014/0159444 A1 | 6/2014 | Guering | |
| 2020/0138202 A1 | 5/2020 | Cordes et al. | |
| 2022/0242570 A1* | 8/2022 | Satterfield | B64D 11/064 |
| 2022/0348332 A1* | 11/2022 | Satterfield | B64D 11/0607 |
| 2023/0065564 A1* | 3/2023 | Koustubhan | B64D 11/064 |
| 2023/0070844 A1* | 3/2023 | Parker | B64D 11/0647 |

* cited by examiner

PASSENGER SEATING ASSEMBLY WITH SWINGING SEATPAN FOR INCREASED PASSENGER EGRESS SPACE

CROSS-REFERENCE TO RELATED APPLICATIONS

The present application is related to and claims the benefit of the earliest available effective filing dates from the following listed applications (the "Related applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related applications).

RELATED APPLICATIONS

Indian Patent Application No. 202241005995 filed Feb. 4, 2022 relating to PASSENGER SEATING ASSEMBLY WITH SWINGING SEATPAN FOR INCREASED PASSENGER EGRESS SPACE.

Said Indian Patent Application No. 202241005995 is herein incorporated by reference in its entirety.

BACKGROUND

Economy class seating in most commercial aircraft incorporates groups of two to five individual seats. In order to maximize the number of farepaying passengers accommodated by economy class seating, the seat pitch distance between rows of seats may be reduced to accommodate additional rows of seating. However, any reduction in seat pitch complicates egress from, and entry into, window seats separated from a central aisle by an aisle seat, and sometimes a middle seat as well. For example, if all three seats are occupied and the passenger occupying the window seat must leave their seat (e.g., to visit a lavatory located elsewhere in the cabin), the passengers occupying the middle and aisle seats must often also vacate their seats to allow sufficient room for the window-seat passenger to egress. When the window-seat passenger returns to their seating row, the process must be repeated so the window-seat passenger can return to their seat. Further, if the middle-seat and aisle-seat passengers must vacate into the aisle, their presence in the aisle may interfere with food or beverage services also making use of the aisle or, in extreme cases, interfere with the window-seat passenger's efforts to reach their destination elsewhere in the cabin.

SUMMARY

In a first aspect, a swinging seatpan assembly for a passenger seat is disclosed. In embodiments, the swinging seatpan assembly includes a fixed seatpan frame secured to a seat frame, e.g., a seat frame for one or more passenger seats mountable to a passenger cabin floor. The swinging seatpan assembly includes a mobile seatpan frame slidably attached to the fixed seatpan frame at one or more attachment points between the forward and rear ends of the mobile seatpan frame. The mobile seatpan frame may define a seat pitch distance between the passenger seat and another passenger seat immediately forward. The mobile seatpan frame is fully or partially covered by a seatpan cover which in turn supports a seat cushion (e.g., upon which a passenger occupying the seat sits). The swinging seatpan assembly includes a release for transitioning the mobile seatpan frame from a locked configuration (e.g., wherein the passenger may be seated in the seat) and a released configuration. When in the released configuration, the passenger can articulate the mobile seatpan frame from a default position (e.g., wherein the passenger may be seated) and an egress position capable of increasing the seat pitch distance. For example, the seated passenger may engage the release and slide the mobile seatpan backward relative to the fixed seatpan frame, simultaneously pivoting the mobile seatpan frame downward relative to the fixed seatpan frame relative to a rotational axis through an attachment point, temporarily increasing the seat pitch distance between the mobile seatpan frame and the passenger seat immediately forward.

In some embodiments, the fixed seatpan frame includes slots extending between forward and rear endpoints, and each attachment point is associated with one or more sliding members, the sliding members translate through the slots between the forward and rear endpoints. For example, sliding members at or near the forward endpoints are associated with the default position of the mobile seatpan frame, and sliding members at or near the rear endpoints with the egress position of the mobile seatpan frame.

In some embodiments, the slots include forward and rear stoppers set into the slots and defining the forward and rear endpoints.

In some embodiments, the mobile seatpan frame is attached to the seat frame via a linear actuator that assists in the transition of the mobile seatpan frame between the default and egress positions.

In some embodiments, the mobile seatpan frame remains in the egress position (e.g., once articulated there by the passenger) until returned by the passenger to the default position (e.g., by re-engaging the release and articulating the mobile seatpan frame forward).

In some embodiments, the release is set into an armrest of the passenger seat.

In some embodiments, the release is set into the mobile seatpan frame, e.g., at the forward end beneath the seat cushion.

In a further aspect, a multi-seat passenger assembly is also disclosed. In embodiments, the multi-seat passenger assembly comprises a group of two or more passenger seats mounted to one or more seat structures set into the passenger cabin floor. For example, the multi-seat passenger assembly may be set between an aisle and a bulkhead including a window, or between two aisles. In embodiments, the multi-seat passenger assembly includes at least one swinging seat (e.g., an aisle seat or middle seat) incorporating a swinging seatpan assembly. For example, each swinging seatpan assembly includes a fixed seatpan frame secured to the seat structure. Each swinging seatpan assembly includes a mobile seatpan frame slidably attached to the fixed seatpan frame at one or more attachment points between the forward and rear ends of the mobile seatpan frame. Each mobile seatpan frame may define a seat pitch distance between the passenger seat and another passenger seat immediately forward. Each mobile seatpan frame is fully or partially covered by a seatpan cover which in turn supports a seat cushion (e.g., upon which a passenger occupying the seat sits). Each swinging seatpan assembly includes a release for transitioning the mobile seatpan frame from a locked configuration (e.g., wherein the passenger may be seated in the seat) and a released configuration. When in the released configuration, the passenger can articulate the mobile seatpan frame from a default position (e.g., wherein the passenger may be seated) and an egress position capable of increasing the seat pitch distance. For example, the seated passenger may engage the release and slide the mobile seatpan backward relative to the fixed seatpan frame, simultaneously pivoting the mobile seatpan frame downward relative to the fixed seatpan frame relative to a rotational axis through an attachment point, temporarily increasing the seat pitch distance between the mobile seatpan frame and the passenger seat immediately forward.

In some embodiments, each fixed seatpan frame includes slots extending between forward and rear endpoints, and each attachment point is associated with one or more sliding members, the sliding members translate through the slots between the forward and rear endpoints. For example, sliding members at or near the forward endpoints are associated with the default position of the mobile seatpan frame, and sliding members at or near the rear endpoints with the egress position of the mobile seatpan frame.

In some embodiments, the slots of each fixed seatpan frame include forward and rear stoppers set into the slots and defining the forward and rear endpoints.

In some embodiments, each mobile seatpan frame is attached to the seat structure via a linear actuator that assists in the transition of the mobile seatpan frame between the default and egress positions.

In some embodiments, each mobile seatpan frame remains in the egress position (e.g., once articulated there by the passenger) until returned by the passenger to the default position (e.g., by re-engaging the release and articulating the mobile seatpan frame forward).

In some embodiments, each release is set into an armrest of its associated passenger seat or into the associated mobile seatpan frame.

In some embodiments, the multi-seat passenger seating assembly includes non-swinging seats adjacent to one or more swinging seats, the non-swinging seats incorporating a conventional seatpan instead of the swinging seatpan assembly.

In some embodiments, the non-swinging seat is a window seat adjacent to a bulkhead which may include a window, and the swinging seats are either middle or aisle seats.

In some embodiments, the non-swinging seat is a middle seat (e.g., when the multi-seat passenger assembly is situated between two aisles).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
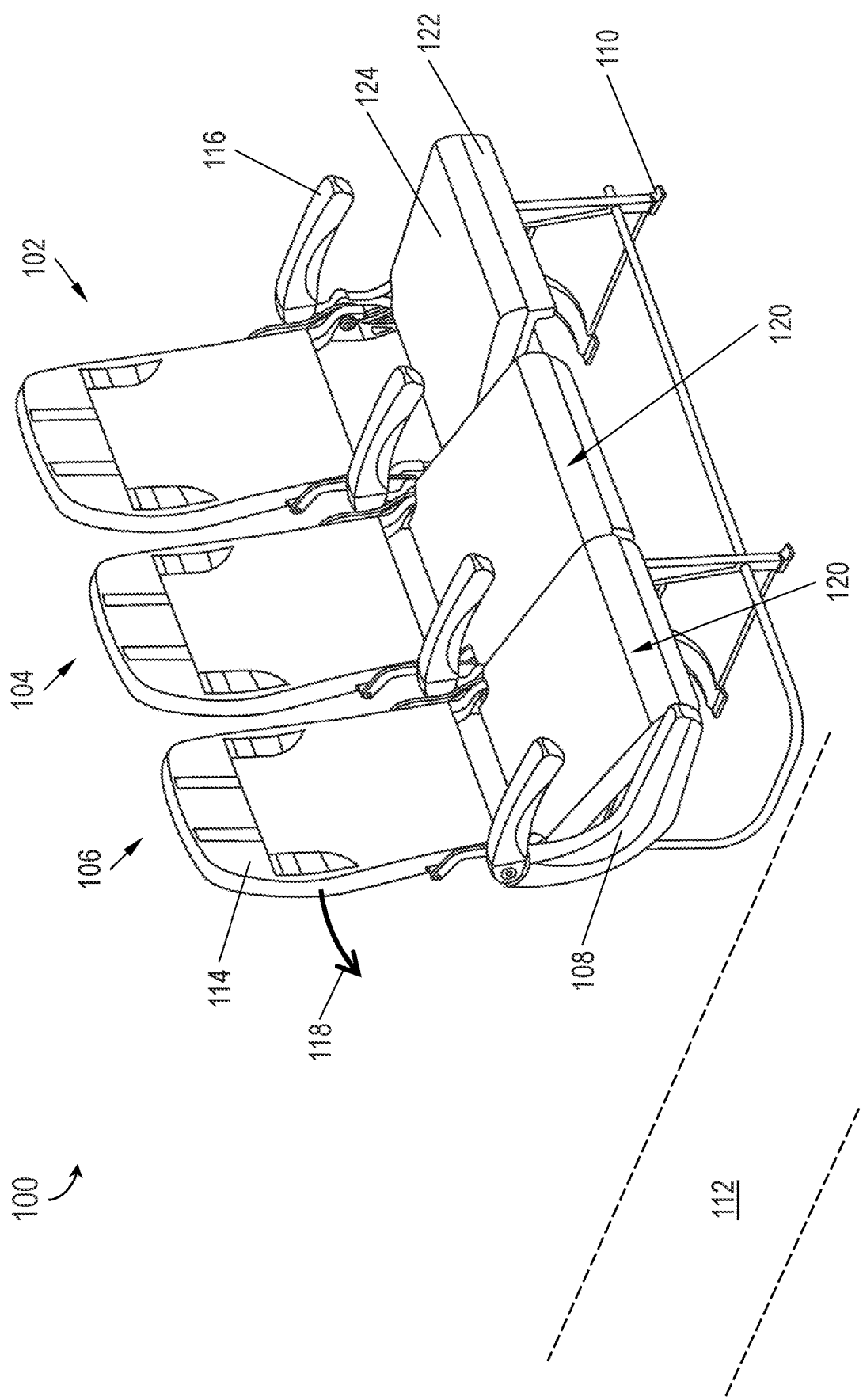
FIG. 1 is an environmental view illustrating a multi-seat passenger seating assembly incorporating a swinging seatpan assembly according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring now to FIG. 1, a passenger seating assembly 100 is disclosed. The passenger seating assembly 100 may incorporate a window seat 102, a middle seat 104, and an aisle seat 106.

In embodiments, the passenger seating assembly 100 may be mounted to a floor of a passenger cabin of an aircraft. For example, the passenger seating assembly may incorporate a seat structure 108 mounted to the aircraft floor, e.g., via track fittings 110. A single seat structure may incorporate at least two passenger seats, most commonly between two and five. For example, the window seat 102 may be adjacent to an aircraft bulkhead which may or may not incorporate a window. Similarly, the aisle seat 106 may be adjacent to a central aisle 112 of the aircraft, via which passengers may embark and disembark from the aircraft proper. In some embodiments, the passenger seating assembly 100 may incorporate one or more middle seats 104 situated between the window seat 102 and the aisle seat 106.

In embodiments, each individual passenger seat of the passenger seating assembly (e.g., the window seat 102, middle seat 104, and aisle seat 106) may include a seatback 114 and at least one armrest 116. For example, each seatback 114 may be configured to recline (118), e.g., when the occupying passenger holds down a button (not shown) set within an armrest 116 adjacent to the passenger and physically forces the seatback backward into a reclined position, releasing the button to lock the seatback into the reclined position. In some embodiments, an armrest 116 may be shared between two adjacent passenger seats (e.g., the window seat 102 and middle seat 104; the middle seat 104 and aisle seat 106), any buttons 116 or other controls necessary to recline or reconfigure the passenger seat set into the armrest facing the occupying passenger.

In embodiments, the middle seat 104 and aisle seat 106 may each include a swinging seatpan assembly 120. For example, each passenger seat of the passenger seating assembly 100 may include a seatpan 122 capable of supporting a seat cushion 124, the seatpan and the seatback 114 collectively capable of supporting an occupying passenger in a seated position. In embodiments, the swinging seatpan assembly 120 may be implemented and may function similarly to the seatpan 122, except that the swinging seatpan assembly may be temporarily forced back from a default position into an egress position, pivoting or articulating the swinging seatpan assembly backward relative to the passenger seating assembly 100 and temporarily increasing the seat pitch distance between the passenger seating assembly and passenger seating situated directly forward thereof. For example, the temporary increase in seat pitch distance may allow the passenger occupying the window seat 102 sufficient space to egress from the window seat and into the central aisle 112 without requiring the passengers occupying the middle seat 104 and the aisle seat 106 to egress their seats. In some embodiments, the window seat 102 may additionally incorporate a swinging seatpan assembly 120.

Figure 2:
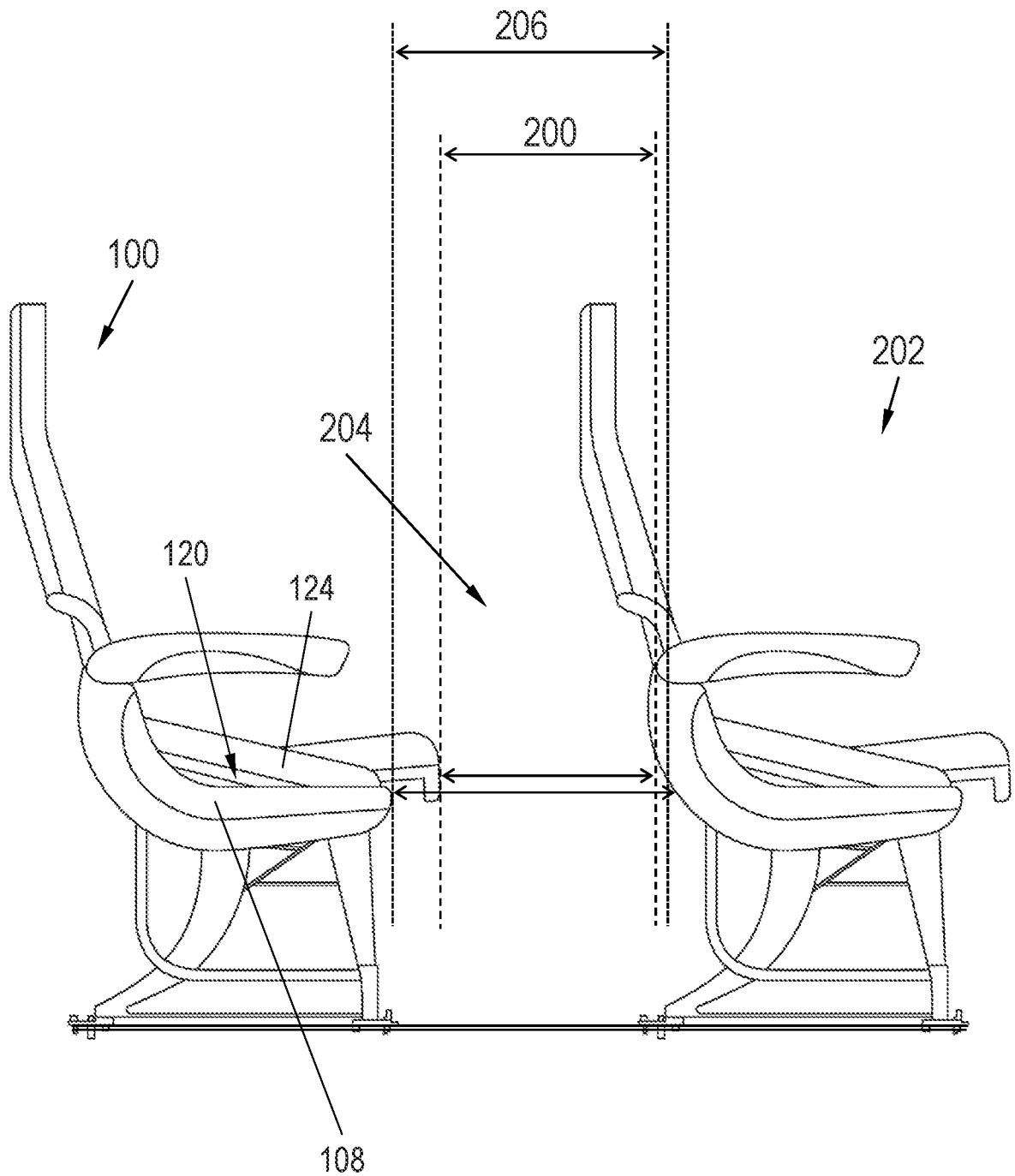
FIG. 2 is a profile view illustrating the multi-seat passenger seating assembly of FIG. 1.

Referring also to FIG. 2, the passenger seating assembly 100 is shown.

In embodiments, the passenger seating assembly 100 may be associated with a standard seat pitch distance 200 between the passenger seating assembly and a second passenger seating assembly 202 situated directly forward of the passenger seating assembly 100, the seat pitch distance defined as a distance between any first point of the passenger seating assembly and the nearest point of the second passenger seating assembly 202 directly forward of the first point. For example, the seat pitch distance 200 may define the space 204 which passengers occupying the middle seat (104, FIG. 1) and window seat (102, FIG. 1) must traverse in order to travel between their seats and the central aisle (112, FIG. 1).

In embodiments, activation of the swinging seatpan assembly 120 by the passengers occupying the middle seat 104 and/or aisle seat 106 may pivot the swinging seatpan assembly 120 and seat cushion 124 backward relative to the seat structure 108, temporarily increasing (206) the seat pitch distance.

Figure 3:
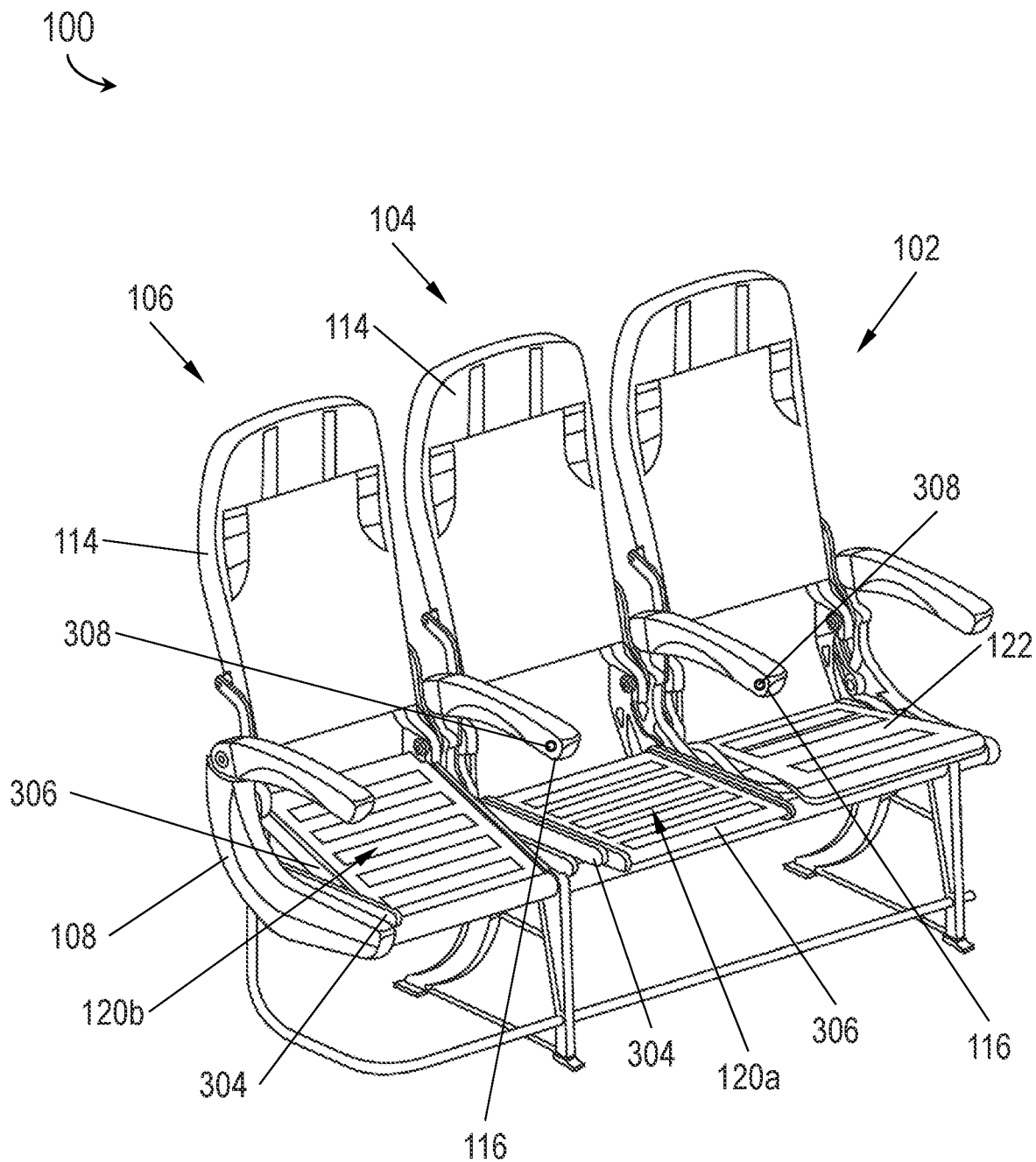
FIG. 3 is an environmental view illustrating the multi-seat passenger seating assembly of FIG. 1.

Referring now to FIG. 3, the passenger seating assembly 100 is shown.

In embodiments, the middle seat 104 and aisle seat 106 may each incorporate a swinging seatpan assembly 120a, 120b while the window seat 102 may incorporate a conventional fixed seatpan 122. For example, if a first passenger occupying the middle seat 104 wishes to egress from or return to their seat, a second passenger occupying the aisle seat 106 may activate their swinging seatpan assembly 120b to allow the first passenger additional room to egress or enter through the space (204, FIG. 2).

In embodiments, each swinging seatpan assembly 120a, 120b may incorporate a fixed seatpan frame 304 fixed to the seat structure 108 and a mobile seatpan frame 306 capable of movement relative to the fixed seatpan frame and to the seat structure. For example, the mobile seatpan frame 306 may have a default configuration associated with a locked position, e.g., the mobile seatpan frame may be locked into a position analogous to the fixed seatpan 302 until released from the default configuration. In embodiments, the first passenger occupying the middle seat 104 may first release the mobile seatpan frame 306 by engaging a release 308 and maintain the mobile seatpan frame in the released configuration by holding down the release. For example, the release 308 may be a button situated in the armrest 116 facing the passenger, e.g., in the armrest opposite the armrest housing the button (not shown) used for reclining (118, FIG. 1) the seatback 114.

Figure 4:
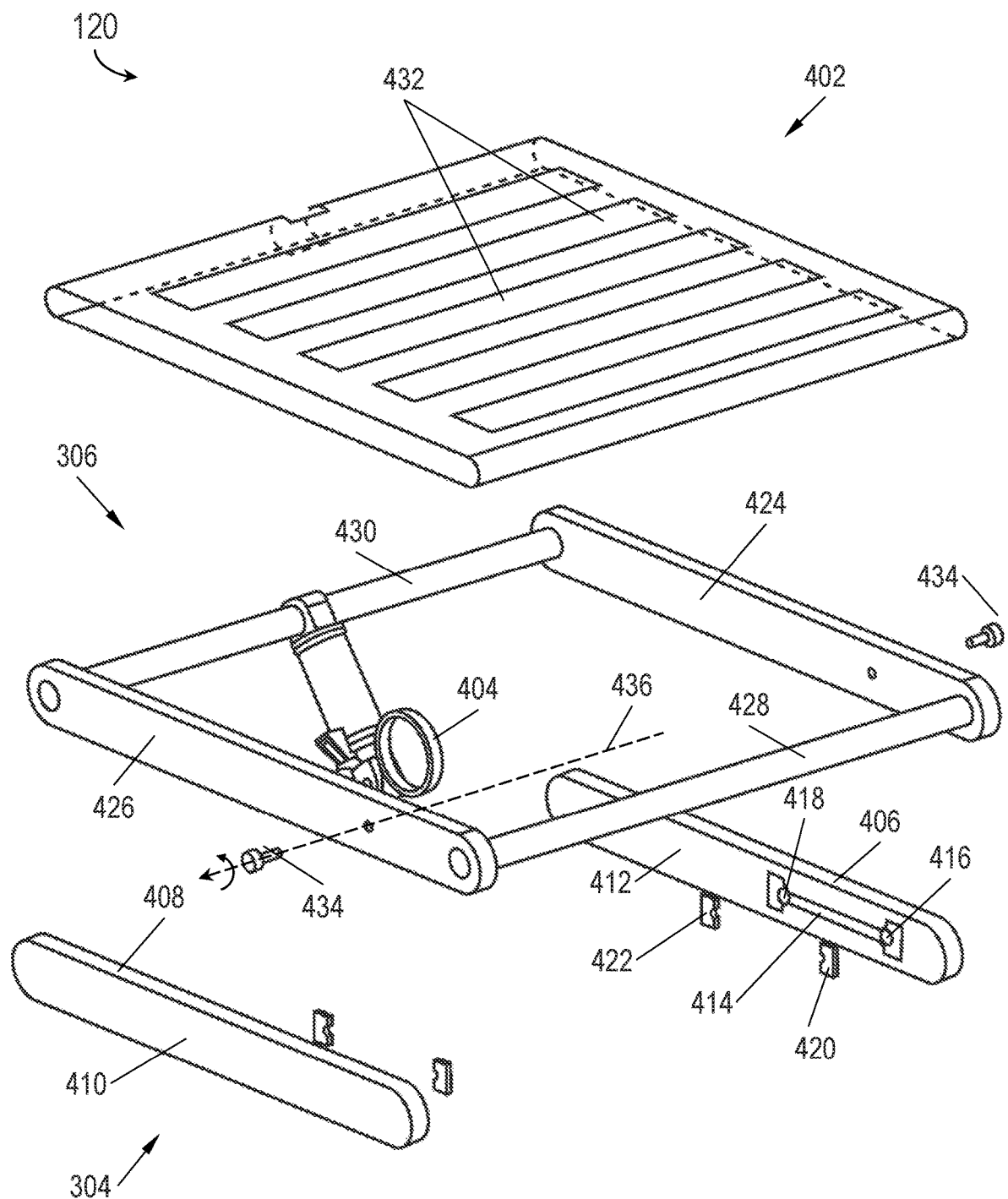
FIG. 4 is an exploded view of a swinging seatpan assembly of the passenger seating assembly of FIG. 1.

Referring now to FIG. 4, the swinging seatpan assembly 120 is shown. The swinging seatpan assembly 120 may include fixed seatpan frame 304, mobile seatpan frame 306, seatpan cover 402, and rear bracket 404.

In embodiments, the fixed seatpan frame 304 may be fixed to the seat structure (108, FIG. 1) and may include a left-side member 406 and a right-side member 408. For example, the left-side and right-side members 406, 408 may each have an outer face 410 and an inner face 412. In embodiments, each inner face 412 of the left-side and right-side members 406, 408 may have a slot 414 set thereinto and extending between a forward endpoint 416 and a rear endpoint 418. For example, the forward and rear endpoints 416, 418 may respectively be defined by a forward stopper 420 and a rear stopper 422 set into the slot 414. In some embodiments, the forward and rear stoppers 420, 422 may be repositionable within the slot 414 to control the degree of travel of the mobile seatpan frame 306 relative to the fixed seatpan frame 304.

In embodiments, the mobile seatpan frame 306 may comprise left-side and right-side members 424, 426 connected by forward and rear crossmembers 428, 430. For example, the seatpan cover 402 may comprise a fabric shell (e.g., Kevlar or any other appropriate durable fabric known in the art) extending between the forward and rear crossmembers 428, 430. In embodiments, the seatpan cover 402 may include hook and loop fasteners 432 (e.g., Velcro or any other like appropriate fastening means known in the art) via which the seat cushion (124, FIG. 1) may be secured to the seatpan cover.

In embodiments, sliding members 434 (e.g., rollers, rolling members) may serve as a point of attachment between the left-side and right-side members 424, 426 of the mobile seatpan frame 306 and the fixed seatpan frame 304. For example, the sliding members 434 may extend from the left-side and right-side members 424, 426 of the mobile seatpan frame 306 into the slots 414 in the inner faces 412 of the left-side and right-side members 406, 408 of the fixed seatpan frame 304. In embodiments, when the mobile seatpan frame 306 is in a locked configuration, the sliding members 434 may remain in a forward position relative to the slots 414, e.g., adjacent to the forward stoppers 420 or to the forward terminus of the slots. In some embodiments, the left-side and/or right-side members 424, 426 may incorporate more than one slot 414 and more than one sliding member 434 translating therein.

Figure 5A:
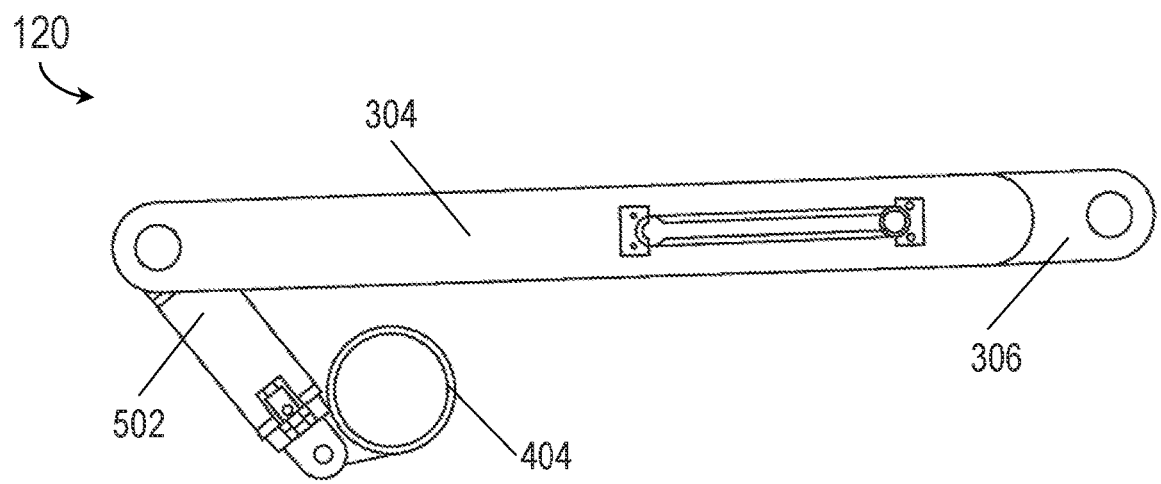
FIGS. 5A and 5B are profile views of the swinging seatpan assembly of FIG. 4, respectively in a default position and an egress position.

Referring also to FIG. 5A, the swinging seatpan assembly 120 is shown in a locked configuration and default position. In embodiments, the mobile seatpan frame 306 may be pivotably attached to the seat structure (108, FIG. 1) via a linear actuator 502 (e.g., linear spring, linear cylinder) and rear bracket 404. For example, the rear bracket 404 may comprise a ring member attachable to a tubular crossmember (not shown) of the seat structure 108 underneath the swinging seatpan assembly 120. In embodiments, the linear actuator 502 may assist with the transitioning of the mobile seatpan frame 306 between its default position as shown by FIG. 5A and an egress position as shown by FIG. 5B.

Figure 5B:
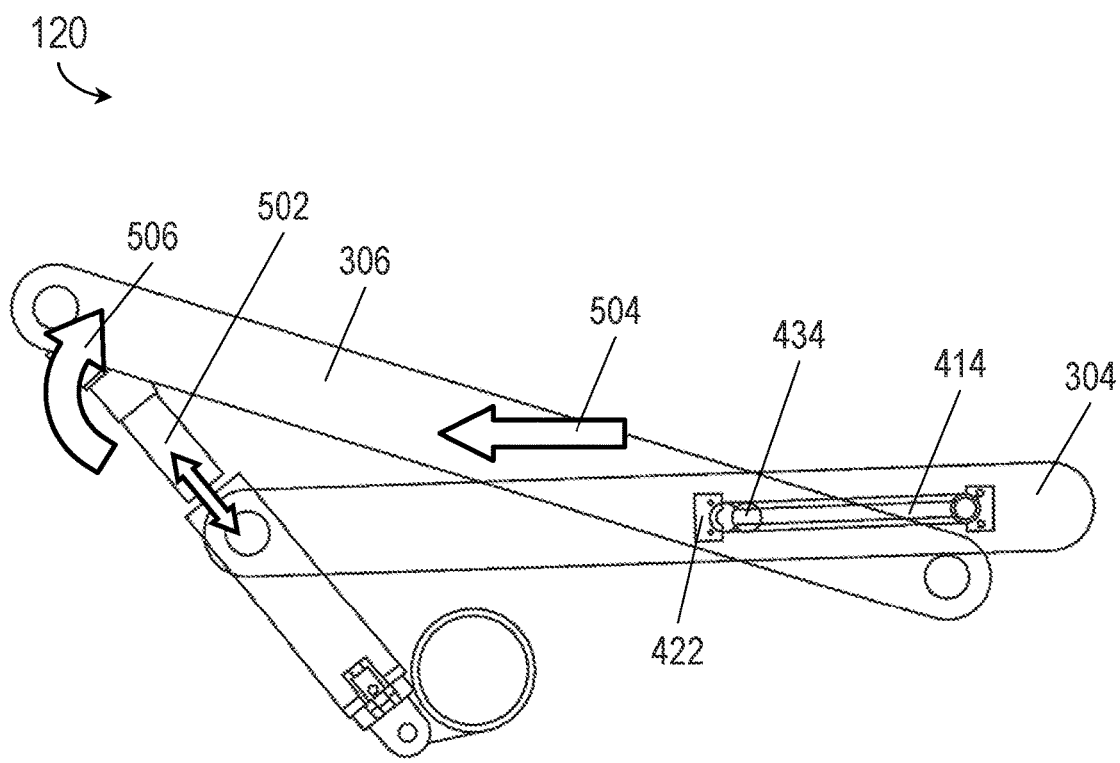

Referring also to FIG. 5B, the swinging seatpan assembly 120 is shown in a released configuration and an egress position. In embodiments, when a passenger engages and maintains the release (308, FIG. 3), transitioning the mobile seatpan frame 306 into the released configuration, the passenger may push backward on the mobile seatpan frame, e.g., with their upper legs, while transitioning from a seated to a semi-seated, semi-standing position. In embodiments, the mobile seatpan frame 306 may be driven rearward (504) relative to the fixed seatpan frame 304 by the free translation of the sliding members 434 through the slots 414. For example, the sliding members 434 may translate rearward 506 along the slots 414 until encountering the rear stoppers 422 (or, e.g., the rear terminus of the slots). The rearward motion 504 of the mobile seatpan frame may temporarily increase (206, FIG. 2) the seat pitch distance (200, FIG. 2).

In embodiments, the engagement and/or maintenance of the release 308 by an occupying passenger may also release the linear actuator 502. For example, when the linear actuator 502 is released and the mobile seatpan frame 306 driven rearward (504) relative to the fixed seatpan frame 304 by the passenger, the linear actuator may allow the mobile seatpan frame to additionally pivot or rotate (506) relative to a rotational axis (436, FIG. 4) defined by the sliding members 434. Assuming a forward-oriented passenger seating assembly 100, the rotational axis 436 may be a lateral axis substantially parallel to a pitch axis (e.g., x-axis) of the aircraft. Accordingly, the forward end of the mobile seatpan frame 306 may dip below the fixed seatpan frame 304 and the rear end of the mobile seatpan frame may rise to the extent allowed by the linear actuator 502.

In some embodiments, the mobile seatpan frame 306 may remain in the egress position shown by FIG. 5B until further engagement by the occupying passenger. For example, should the occupying passenger again engage the release 308 and/or push downward on the mobile seatpan frame 306, the passenger's weight (assisted by the linear actuator 502) may return the mobile seatpan frame to the default position shown by FIG. 5A.

Figure 6A:
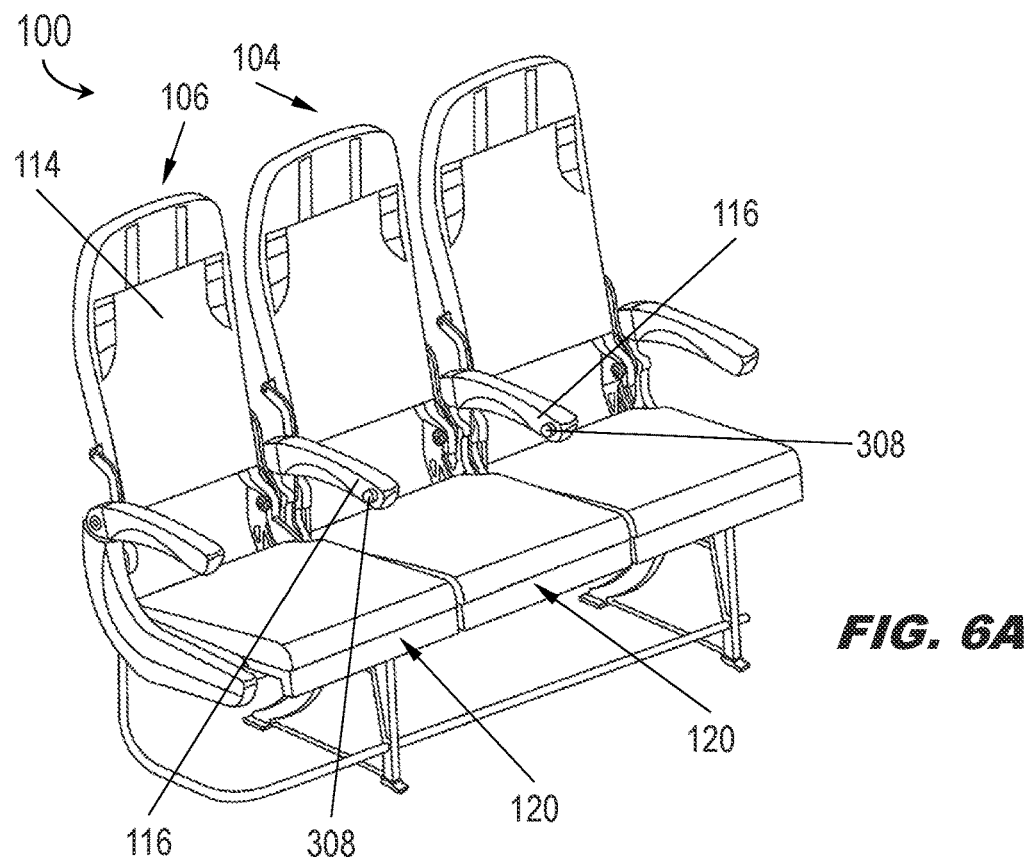
FIGS. 6A and 6B are environmental views of the passenger seating assembly of FIG. 1 showing various positions for release buttons for the swinging seatpan assemblies thereof.
Figure 6B:
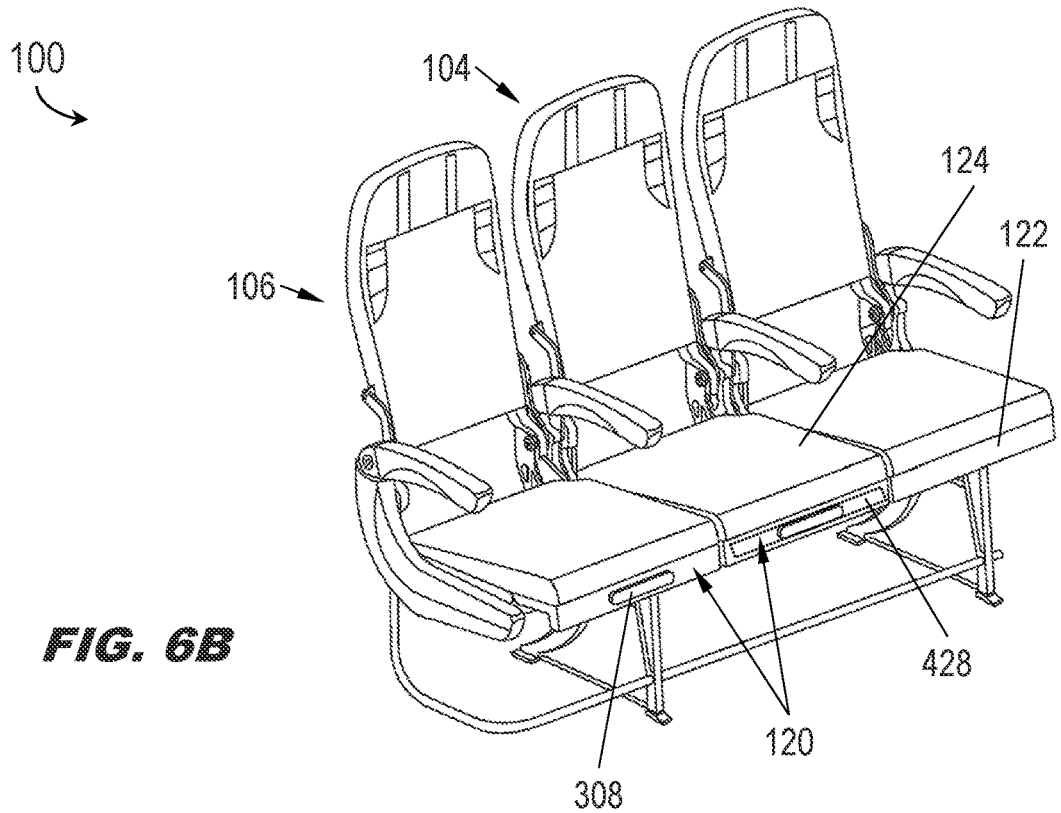

Referring to FIGS. 6A and 6B, the passenger seating assembly 100 is shown.

In embodiments, the middle seat 104 and aisle seat 106 may each include a release 308 for transitioning the swinging seatpan assembly 120 into the released configuration. For example, each release 308 may be set into an armrest 116 facing the swinging seatpan assembly 120 to which it is linked. For example, if each of the middle seat 104 and aisle seat 106 has a recline button (not shown) set into its right-side armrest 116 for reclining (118, FIG. 1) the seatback 114, the respective releases 308 for the middle seat and aisle seat may set into the left-side armrest relative to the seat.

Referring in particular to FIG. 6B, in some embodiments the releases 308 may be set into the respective seatpan 122 (e.g., into the forward crossmember 428 of the mobile seatpan frame 306) of the middle seat 104 or aisle seat 106, situated under the seat cushion 124.

Figure 7:
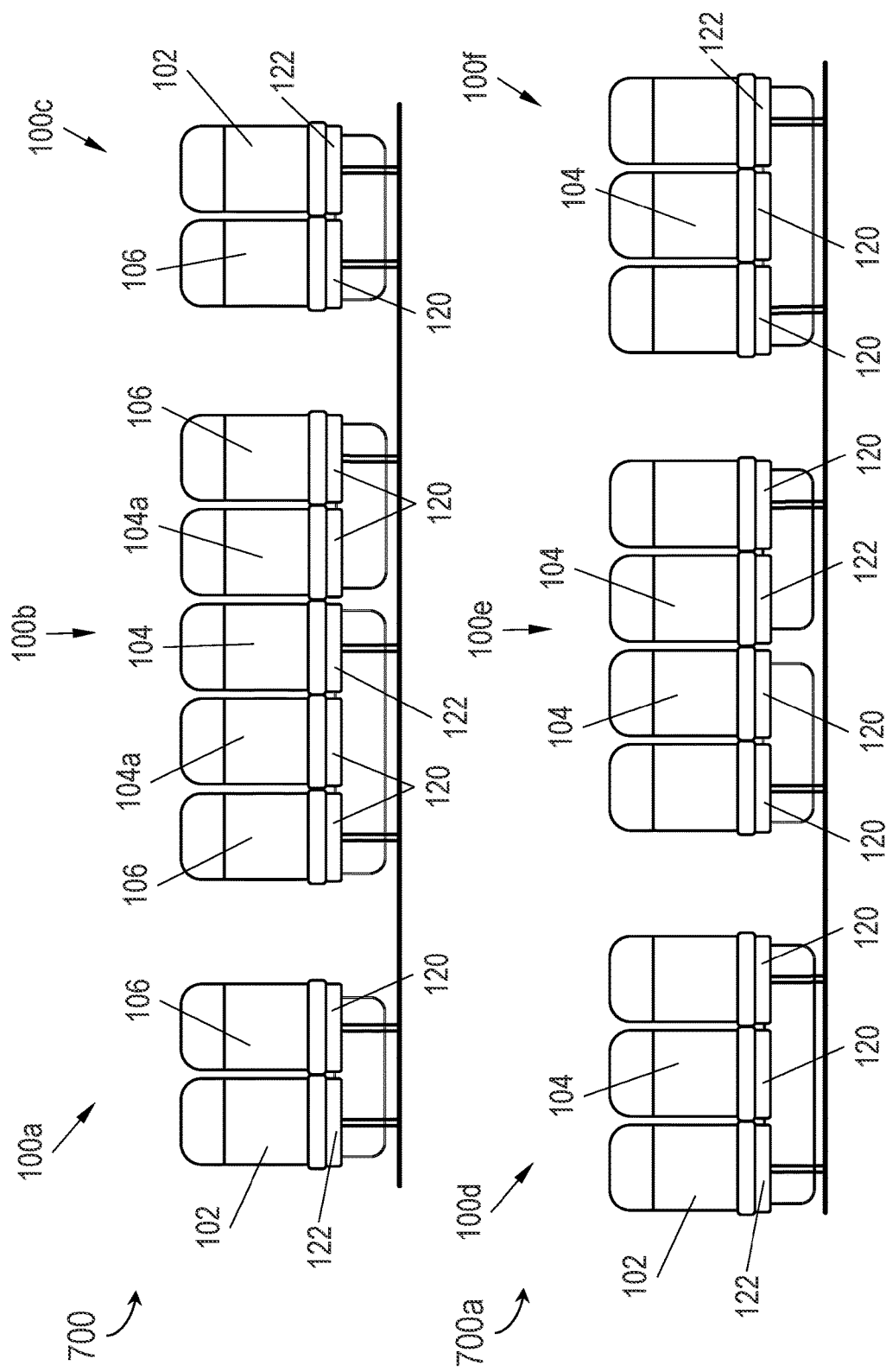
FIG. 7 is a forward view of seating configurations incorporating variations of the passenger seating assembly of FIG. 1.

Referring now to FIG. 7, the passenger seating configurations 700 and 700a may be situated in a widebody aircraft having multiple aisles 112a, 112b, either aisle providing for embarkation, disembarkation, or movement throughout the passenger cabin. Accordingly, in some embodiments, the individual passenger seats and seating assemblies 100a-100e (e.g., groups of two or more passenger seats) comprising the passenger seating configurations 700, 700a may incorporate various combinations of swinging seatpan assemblies 120 and conventional seatpans 122 to facilitate entry to and egress from the centermost (e.g., and least accessible) passenger seats of said seating configurations and/or seating assemblies by temporarily increasing the seat pitch distance between any passenger seat and the passenger seating situated directly forward thereof.

For example, the passenger seating configuration 700 may comprise three groups of seating assemblies 100a, 100b, 100c in a 2-5-2 configuration. In some embodiments, the seating assemblies 100a, 100c may each comprise a window seat 102 (which may incorporate, e.g., either a conventional seatpan 122 or a swinging seatpan assembly 120) and an aisle seat 106 directly adjacent to each window seat 102 and incorporating a swinging seatpan assembly 120. In embodiments, the centrally located seating assembly 100b may comprise a group of five adjacent passenger seats, e.g., a centermost middle seat 104 (which may incorporate, e.g., either a conventional seatpan 122 or a swinging seatpan assembly 120); middle seats 104a on either side, each incorporating a swinging seatpan assembly 120; and aisle seats 106 also incorporating the swinging seatpan assembly.

Similarly, in some embodiments the seating configuration 700a may comprise three groups of seating assemblies 100d, 100e, 100f in a 3-4-3 configuration. For example, the seating assemblies 100d, 100f may be implemented similarly to the seating assembly 100 shown by FIG. 1, while the seating assembly 100e may comprise a group of four passenger seats, e.g., two inner middle seats 104 (which may incorporate, e.g., either a conventional seatpan 122 or a swinging seatpan assembly 120), and two outer aisle seats 106 incorporating a swinging seatpan assembly 120.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A swinging seatpan assembly for a passenger seat, comprising:
   a fixed seatpan frame securely mountable to a seat structure associated with one or more passenger seats, the seat structure mountable to a floor of an aircraft cabin, the fixed seatpan frame comprising a left-side member and a right-side member, each of the left-side and right-side members including a slot extending along the inner face thereof;
   a mobile seatpan frame comprising left-side and right-side members connected by forward and rear crossmembers, the left-side and right-side members respectively slidably and pivotably attached to the left-side and right-side members of the fixed seatpan frame via a sliding member configured for translation along the slot, the mobile seatpan frame associated with a seat pitch distance between a first passenger seat of the one or more passenger seats and a second passenger seat directly forward of the one or more passenger seats;
   a seatpan cover extending between the forward and rear crossmembers of the mobile seatpan frame, the seatpan cover configured to support a seat cushion;
   and
   at least one release configured for transitioning the mobile seatpan frame between a locked configuration and a released configuration, the mobile seatpan frame and the seatpan cover configured to support a seated passenger when in the locked configuration;
   the mobile seatpan frame, when in the released configuration, capable of being articulated by the seated passenger from a default position associated with the locked configuration into an egress position associated with an increase of the seat pitch distance via:
   1) slidably articulating the mobile seatpan frame relative to the fixed seatpan frame;
   and
   2) pivotably articulating the mobile seatpan frame relative to a rotational axis corresponding to the sliding members.

2. The swinging seatpan assembly of claim 1, wherein:
   each slot extends between a forward position associated with the default position of the mobile seatpan frame and a rear position associated with the egress position of the mobile seatpan frame;
   and
   wherein each sliding member is configured for translation between the forward and rear positions.

3. The swinging seatpan assembly of claim 2, wherein:
   each slot includes a forward stopper and a rear stopper set thereinto, the forward stopper defining the forward position and the rear stopper defining the rear position.

4. The swinging seatpan assembly of claim 1, wherein:
   the mobile seatpan frame is attached to the seat structure by at least one linear actuator configured to assist the transition of the mobile seatpan frame between the default position and the egress position.

5. The swinging seatpan assembly of claim 1, wherein the mobile seatpan frame is configured to remain in the egress position until returned by the seated passenger to the default position.

6. The swinging seatpan assembly of claim 1, wherein:
   the seat structure includes at least one armrest;
   and
   wherein the release is set into the at least one armrest.

7. The swinging seatpan assembly of claim 1, wherein the release is set into the mobile seatpan frame.

8. A multi-seat passenger seating assembly, comprising:
   a seat structure mountable to a floor of an aircraft cabin;
   and
   at least one swinging seat, each swinging seat comprising:
      a fixed seatpan frame securely attached to the seat structure, the fixed seatpan frame comprising a left-side member and a right-side member, each of the left-side and right-side members including a slot extending along the inner face thereof;
      a mobile seatpan frame comprising left-side and right-side members connected by forward and rear cross-members, the left-side and right-side members respectively slidably and pivotably attached to the left-side and right-side members of the fixed seatpan frame via a sliding member configured for translation along the slot, the mobile seatpan frame associated with a seat pitch distance between the swinging seat and a passenger seat directly forward of the swinging seat;
      a seatpan cover extending between the forward and rear crossmembers of the mobile seatpan frame, the seatpan cover configured to support a seat cushion;
      and
      at least one release configured for transitioning the mobile seatpan frame between a locked configuration and a released configuration, the mobile seatpan frame and the seatpan cover configured to support a seated passenger when in the locked configuration;
      the mobile seatpan frame, when in the released configuration, capable of being articulated by the seated passenger from a default position associated with the locked configuration into an egress position associated with an increase of the seat pitch distance via:
      1) slidably articulating the mobile seatpan frame relative to the fixed seatpan frame;
      and
      2) pivotably articulating the mobile seatpan frame relative to a rotational axis corresponding to the sliding members.

9. The multi-seat passenger seating assembly of claim 8, wherein:
   each slot extends between a forward position and a rear position, the forward position associated with the default position of the mobile seatpan frame and the rear position associated with the egress position of the mobile seatpan frame;
   and wherein each sliding member is configured for translation along the associated slot between the forward and rear positions.

10. The multi-seat passenger assembly of claim 9, wherein:
each slot includes a forward stopper and a rear stopper set thereinto, the forward stopper defining the forward position and the rear stopper defining the rear position.

11. The multi-seat passenger seating assembly of claim 8, wherein:
each mobile seatpan frame is attached to the seat structure by at least one linear actuator, the at least one linear actuator configured for returning the mobile seatpan frame to the default position.

12. The multi-seat passenger seating assembly of claim 8, wherein each release is set into at least one of an armrest or the mobile seatpan frame.

13. The multi-seat passenger seating assembly of claim 6, further comprising:
at least one non-swinging seat adjacent to a swinging seat.

14. The multi-seat passenger seating assembly of claim 13, wherein:
the at least one non-swinging seat includes a window seat configured for placement adjacent to at least one of an aircraft bulkhead or an aircraft window; and
wherein each swinging seat is one of an aisle seat or a middle seat.

15. The multi-seat passenger seating assembly of claim 13, wherein the at least one non-swinging seat includes at least one middle seat.

\* \* \* \* \*